United States Patent
Heyn et al.

(10) Patent No.: US 8,978,844 B2
(45) Date of Patent: Mar. 17, 2015

(54) ADJUSTABLE DAMPING VALVE ARRANGEMENT

(71) Applicants: Steffen Heyn, Niederwerrn (DE); Markus Güther, Sennfeld (DE)

(72) Inventors: Steffen Heyn, Niederwerrn (DE); Markus Güther, Sennfeld (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 13/921,352

(22) Filed: Jun. 19, 2013

(65) Prior Publication Data

US 2013/0341141 A1 Dec. 26, 2013

(30) Foreign Application Priority Data

Jun. 21, 2012 (DE) .......................... 10 2012 210 458

(51) Int. Cl.
*F16F 9/34* (2006.01)
*F16F 9/46* (2006.01)

(52) U.S. Cl.
CPC .. *F16F 9/34* (2013.01); *F16F 9/461* (2013.01)
USPC ..................................................... 188/266.5

(58) Field of Classification Search
USPC ............ 188/266.2, 266.5, 266.6, 267, 299.1, 188/322.15
See application file for complete search history.

(56) References Cited

U.S. PATENT DOCUMENTS

| | | | | | |
|---|---|---|---|---|---|
| 5,248,014 | A | * | 9/1993 | Ashiba ........................ | 188/282.8 |
| 5,303,804 | A | * | 4/1994 | Spiess ......................... | 188/266.5 |
| 5,368,142 | A | * | 11/1994 | Ashiba et al. .............. | 188/282.1 |
| 5,409,088 | A | * | 4/1995 | Sonsterod .................. | 188/282.3 |
| 6,003,644 | A | * | 12/1999 | Tanaka ........................ | 188/266.5 |
| 7,946,399 | B2 | * | 5/2011 | Masamura .................. | 188/282.4 |
| 2011/0168935 | A1 | | 7/2011 | Heyn et al. | |
| 2013/0015028 | A1 | * | 1/2013 | Heyn et al. ............... | 188/322.13 |
| 2013/0340865 | A1 | * | 12/2013 | Manger et al. ............ | 137/561 R |
| 2013/0341142 | A1 | * | 12/2013 | Forster ..................... | 188/322.15 |
| 2013/0341540 | A1 | * | 12/2013 | Manger et al. ............ | 251/30.01 |

* cited by examiner

*Primary Examiner* — Christopher Schwartz
(74) *Attorney, Agent, or Firm* — Cozen O'Connor

(57) ABSTRACT

An adjustable damping valve arrangement for a vibration damper comprises an actuator which exerts an actuating force on an auxiliary valve body of an auxiliary valve. The auxiliary valve influences a closing force on a main stage valve. A pressure depending on the pressure level in a working space of the vibration damper acts on at least one pressure-impinged closing surface of the main stage valve via a flow connection. The flow connection is carried out so as to be functionally parallel to an incident flow of the main stage valve, and a flow-in opening of the flow connection is oriented at an angle of at least 60° to the flow direction into the main stage valve so that only a static pressure acts on the closing surface of the main stage valve.

8 Claims, 3 Drawing Sheets

ADJUSTABLE DAMPING VALVE ARRANGEMENT

BACKGROUND OF THE INVENTION

1. Field of the Invention

The present invention is directed to an adjustable damping valve arrangement for a vibration damper.

2. Background of the Invention

U.S. 2011/0168935 A1 relates to a generic adjustable damping valve arrangement in which its main stage valve body has two pressure-impinged surfaces acting in closing direction. Among the advantages offered by this type of construction of the main stage valve is that the construction of the opening surface in rebound direction is simplified as a result of the enlarged closing surface. As a result of this type of construction of the damping valve arrangement, the damping force that can be achieved in compression direction is increased. This increase in damping forces can certainly be desirable, e.g., when a larger damping force range must be covered at a given actuator force.

However, there is also a demand for damping force characteristics which are as soft as possible. Of course, in this case recourse could be had again to a constructional form with only one pressure-impinged surface in closing direction at the main stage valve body. However, this option is not expedient from a cost perspective.

It is thus an object of the present invention to make it possible to decrease the damping force level in a generic damping valve arrangement.

SUMMARY OF THE INVENTION

According to the invention, this object is met in that the flow connection is carried out so as to be functionally parallel to an incident flow of the main stage valve, wherein a flow-in opening of the flow connection is oriented at an angle of at least 60° to the flow direction into the main stage valve so that only a static pressure acts on the closing surface of the main stage valve.

A reduced pressure on the pressure-impinged closing surface can be achieved by a simple guiding of flow inside the damping valve arrangement. An angle of 90° is preferably used.

To improve the effect of the pressure reduction, a deflecting profile is arranged upstream of the flow-in opening in flow direction.

In a further advantageous embodiment, the deflecting profile is executed on an annular element of the damping valve arrangement. Optionally, the annular element can be executed in the damping valve arrangement, i.e., appreciably different damping force characteristic ranges can be covered by a damping valve arrangement which is identical per se.

According to an advantageous embodiment, the annular element has channel portions of the flow connection. This simplifies production efforts for the flow connection inside the damping valve arrangement.

A collecting channel running in circumferential direction is arranged downstream of the flow-in opening and is connected to individual channels of the flow connection so as to allow any installation position for the annular element.

When two pressure-impinged closing surfaces are provided at the main stage valve, for example, a closing surface can also be connected to the incident flow opening for an incident flow direction. However, there is also the advantageous option of connecting a plurality of pressure-impinged closing surfaces to the incident flow opening. The larger the pressure-impinged surface or surfaces, the greater the achievable effect for the reduction of damping force.

At least two pressure-impinged closing surfaces can also be arranged in series with respect to the flow path. This type of construction leads to the advantage that both pressure-impinged closing surfaces are influenced by one incident flow opening.

A particularly large difference in damping force between damping during a compression movement and damping for a rebound movement is achieved when a flow-in opening is formed for only one working space.

In an alternative embodiment, a throttle is arranged in the flow connection. For example, the throttle can be constructed in a sleeve which can be pressed into the flow connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully below with reference to the drawings in which.

DETAILED DESCRIPTION OF THE PRESENTLY PREFERRED EMBODIMENTS

Figure 1:
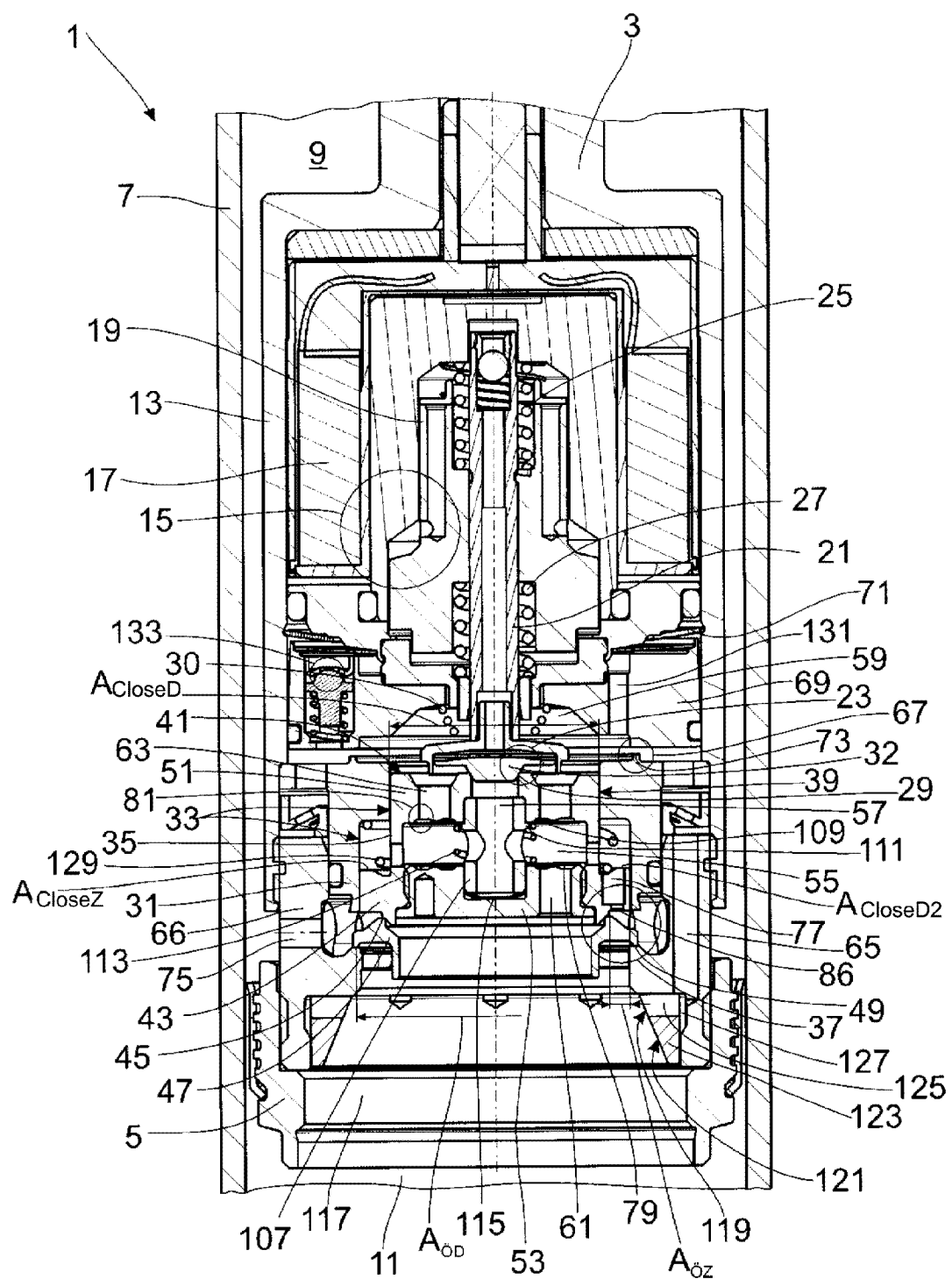
FIG. 1 shows an adjustable damping valve arrangement with an incident flow opening.

FIG. 1 shows a damping valve arrangement 1 which is fastened, e.g., to a piston rod 3 of a vibration damper, shown only partially. The damping valve arrangement 1 comprises a piston 5 which divides a cylinder 7 into a working chamber 9 on the piston rod side and a working chamber 11 remote of the piston rod, both of which working chambers 9; 11 are filled with damping medium. In this embodiment example, the damping valve arrangement is fastened to the piston rod 3, but the invention is not limited to an arrangement of this kind.

An actuator 15 of optional design is arranged in an outer housing 13. Serving as actuator in this example is a magnetic coil 17 which exerts a force on an axially movable armature 19, this force being transmitted to a multiple-part auxiliary valve body 21 of an auxiliary valve 23. The design of the auxiliary valve body is described in detail in connection with FIG. 3. At least one valve spring—in this variant, two opposing valve springs 25; 27 are used—preloads the auxiliary valve body 21 in the lift direction with respect to an auxiliary valve surface 29 of the auxiliary valve 23. The actuator 15 acts in the closing direction of the auxiliary valve 23. The force of the at least one valve spring 25; 27 and the force of the actuator 15 form a resultant force which acts on the auxiliary valve body 21 in the lift direction.

An auxiliary valve closing spring 30 impinges on an auxiliary valve seat body 32 in closing direction regardless of the actuator setting.

A stepped opening 33 in which a main stage valve body 35 of a main stage valve 37 can execute an axial movement is formed in an inner housing 31 of the damping valve arrangement 1. The main stage valve body 35 has a guide sleeve 39 whose back side 41 forms a surface $A_{CloseD}$ that is pressure-impinged by damping medium. Further, the main stage valve body 35 has a radial shoulder 43 which has an additional pressure-impinged surface $A_{CloseD2}$ in the direction of the back side 41.

In a neutral position of the piston rod 3, i.e., without opening force, the main stage valve body 35 contacts a valve seat surface 45 of an axially movable valve ring 47 which contacts a housing-side valve seat surface 49 at the side of the axially movable valve ring 47 facing in direction of the working chamber 11 remote of the piston rod.

The main stage valve body 35 is formed of a plurality of parts. An outer cup 51 forms the guide sleeve 39 and the radial shoulder 43. In a separation plane, an inner disk 53 defines with the cup 51 a radial damping medium flow path 55 between the additional pressure-impinged surface $A_{CloseD2}$, as part of the main stage valve, and a control space 57, as part of the auxiliary valve, whose outlet cross section is determined in direction of a rear space 59 by the valve body 21.

The additional surface $A_{CloseD2}$ of the main stage valve body 35 can be acted upon with damping medium via at least two flow paths. A first feed flow channel 61 is formed directly in the main stage valve body 35 as an axial passage. An out-flow channel 63 extends inside the main stage valve body 35 between the rear space 59 of the main stage valve 37 and the damping medium flow path 55.

A flow connection 65 of the rear space 59 to the working chamber 11 remote of the piston rod inside a connection sleeve 66 between the outer housing 13 and the piston 5 is controlled by an emergency operation valve 67. The emergency operation valve 67 is formed by a valve ring 69 which is lifted from an emergency operation valve seat surface 73 by the actuator 15 against the force of at least one closing spring 71. Even a slight application of energy is sufficient for the actuator 15 to achieve the lift movement of the valve ring 69. The auxiliary valve closing spring 30 is also supported axially at the valve ring 69 so that there is a slight closing force of the auxiliary valve closing spring 30 when the emergency operation valve 67 is open. In this example, the magnetic force of the magnetic coil 17 acts on the valve ring 69. As a result of apt dimensioning of the spring forces and magnetic forces, a strict separation can be achieved between an emergency operating state and a normal operating state. In this way, the flow path between the rear space 59 and the working chamber 11 remote of the piston rod can be influenced by means of the emergency operation valve 67.

At least one connection orifice 75 leading from the working chamber 9 on the piston rod side to the pressure-impinged surface $A_{ÖZ}$ at the underside of the radial shoulder and to the control space 57 is formed in the connection sleeve 66 of the damping valve arrangement 1. For this purpose, the main stage valve body 35 has at least one axial opening 77 in the region of the radial shoulder 43.

With the damping medium flow path 55 and the feed flow channel 61 for two separate incident flow paths $A_{ÖZ}$ and $A_{ÖD}$, the auxiliary valve also has separate flow connection portions to the control space 57. A check valve 79 and a damping valve 81 functioning as a check valve are arranged in the feed flow channel 61 and in the flow-off channel 63 so that damping medium does not escape through the feed flow channel 61 and flow-off channel 63 in the main stage valve body 35 in direction of the working space 11 remote of the piston rod when there is an incident flow via the connection orifice 75. In so doing, the damping valve 81 is connected to the rear space 59 by the flow-off channel 63. During a lift movement of the main stage valve body when the rear space is closed, the damping valve 81 releases the flow path for a flow of damping medium out of the rear space 59 in direction of the additional surface $A_{CloseD2}$ in connection with a damping force.

Figure 3:
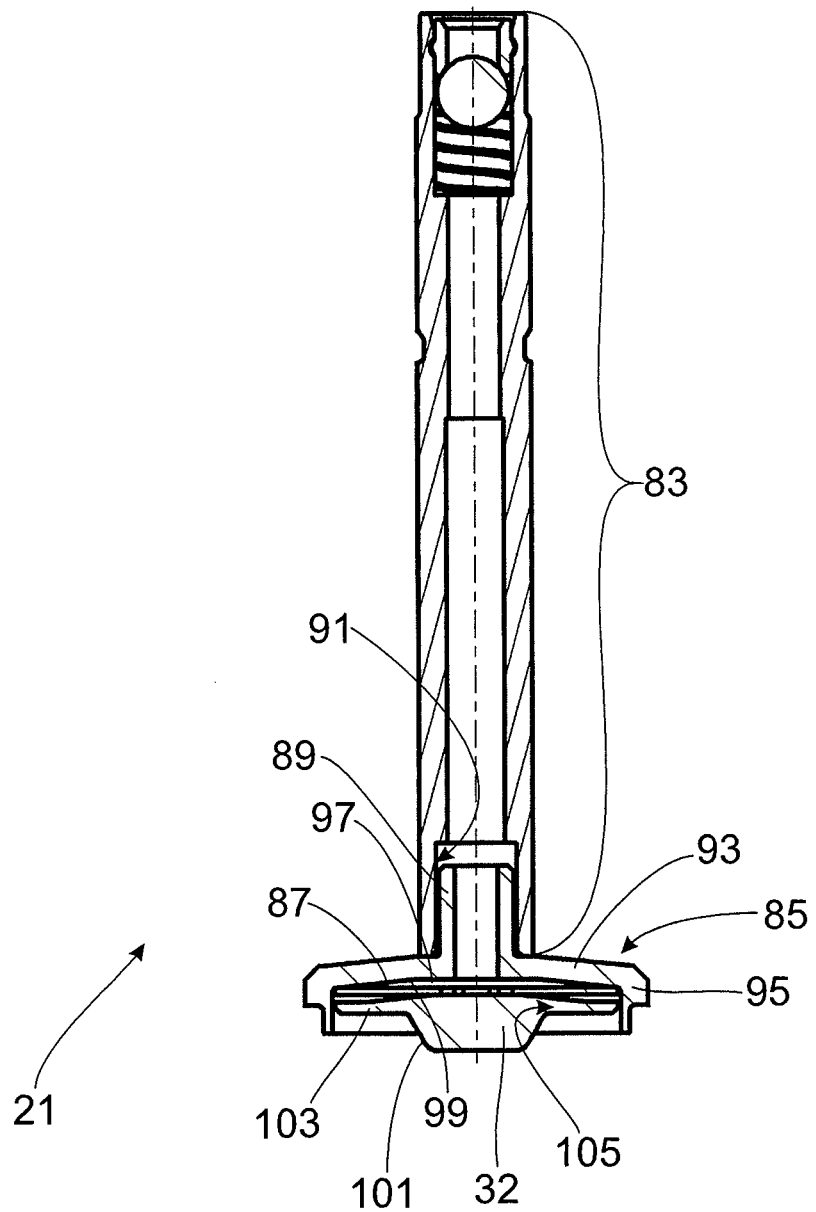
FIG. 3 shows an auxiliary valve body as individual part.

FIG. 3 is limited to a section from FIG. 1. The auxiliary valve body 21 comprises a shaft portion 83 which forms an interference fit with the armature 19. The shaft portion 83 is constructed as a hollow body in order to supply a back side of the armature 19 with damping medium for hydraulic pressure compensation.

The shaft portion 83 is adjoined by a spring holder 85 which carries a spring element 87. The spring holder 85 has a guide pin 89 in the direction of the shaft portion 83, which guide pin 89 engages in a radial positive-engagement connection with a guide surface 91 of the shaft portion 83.

The guide pin 89 has a fastening flange 93 for the spring element 87. The spring element 87, which is constructed as a disk spring, is centered together with the auxiliary valve seat body 32 by a radial wall 95 as part of the fastening flange 93. The spring element 87 acts upon two portions of the auxiliary valve body 21 at a distance, namely the auxiliary valve seat body 32 and the shaft portion 83. The spring holder 85 contacts the shaft portion 83 axially without clearance after the final assembly of the damping valve arrangement 1.

The spring holder 85 has a free space 97 for receiving a spring path of the spring element 87. For this purpose, the fastening flange 93 is constructed with a cone. The disk spring 87 is supported by its outer diameter at the cone. The cone forms a supporting surface 99 for limiting the deformation of the spring element 87.

The wall 95 of the fastening flange 93 is constructed so as to be somewhat longer axially than the structural height of the disk spring 87 and of the auxiliary valve seat body 32. A protruding portion serves for a positive-engagement connection so that the spring holder 85, the spring element 87 and the auxiliary valve seat body 32 form a constructional unit.

The auxiliary valve seat body 32 is constructed as a solid component and has a closure region 101 projecting into the control space 57 (FIG. 1). It adjoins a disk body 103 which extends radially up to the wall 95 of the spring holder 85. A central contact face is formed for the spring element 87 on the top side of the auxiliary valve seat body 32 facing in direction of the spring holder 85. Adjoining radially outwardly is a conical transition 105 which likewise receives the deformation path of the disk spring 87.

FIG. 1 further shows that a clamping pin 107 of the main stage valve body 35 preloads at least one valve disk 109 of the damping valve 81 at least indirectly in closing direction. Formed at the clamping pin 107 is a circumferential collar 111 which preloads at least one flexible valve disk 109 of the damping valve 81 on a valve seat surface. The preloading of a check valve spring 113 does not depend on the preloading of the flexible valve disk 109. The clamping pin 107 can be secured by an interference fit in the main stage valve body 35. The loading capacity of the interference fit is appreciably greater than the preloading force on the damping valve 81. Alternatively, a preloading spring 115 can be arranged axially between the clamping pin 107 and the inner disk 53 of the main stage valve body 35. The preloading force of the preloading spring 115 is likewise greater than the required preloading force on the damping valve 81.

There are four basic operating states to be considered which will be described with reference to FIG. 1. A first operating state of the damping valve arrangement 1 is characterized by an incident flow proceeding from the working chamber 11 remote of the piston rod via a passage 117 to the valve ring 47 and main stage valve body 35 in order to lift the valve ring 47 and the main stage valve body 35 jointly in opening direction. Via passage 117, the damping medium flows mostly to the main stage valve body 35. A volume flow controlling the function of the main stage valve 37 flows in the direction of at least one flow-in opening 119 of the flow connection 65. The flow-in opening 119 is oriented at an angle of at least 60° to the flow direction to the main stage valve 37 and is arranged at an appreciable distance upstream thereof with respect to the flow path to the main stage valve 37. In this concrete embodiment, the angle is virtually 90°. Consequently, only a static pressure acts upon the closing surfaces $A_{CloseD}$; $A_{CloseD2}$ of the main stage valve 37. A deflecting profile 121 is arranged in front of the flow-in opening 119 in the flow direction. The deflecting profile 121 and the flow-in opening 119 are constructed on an annular element 123. Use of this annular element 123 is optional. This affords the possibility of covering two distinctly different damping force characteristic ranges with an otherwise identical damping valve arrangement 1. The pressure level on the closing surfaces of the main stage valve body is reduced by the annular element 123 with the result that the damping force characteristic tends to be softer. Alternatively, by dispensing with the annular element 123, both the static and dynamic pressure inside the damping valve arrangement can be made use of so that the pressure which is increased in comparison also has a greater hydraulic closing force and, therefore, there is also a harder damping force characteristic of the damping valve arrangement 1.

Downstream of the flow-in opening 119, the annular element 123 has a radial channel portion 125 which forms part of the flow connection 65. Further, a collecting channel 127 which extends in circumferential direction and is connected to individual channels of the flow connection 65 is arranged downstream of the at least one flow-in opening 119.

In this embodiment form, the flow-in opening 119 is effective only for the pressure-impinged closing surface $A_{CloseD}$. The additional pressure-impinged surface $A_{CloseD2}$ is supplied directly via the feed flow channel 61 with damping medium under static and dynamic pressure.

Further, the use of the flow-in opening 119 oriented according to the invention is realized only for the incident flow from the working space 11 remote of the piston rod.

The emergency operation valve 67 is switched on, i.e., lifted from its emergency operation valve seat surface 73 as in the illustrated position, and the actuator 15 acts against the force of the valve springs 25; 27. The preloading of the auxiliary valve closing spring takes on the minimum magnitude so that the valve closing spring has practically no effect on the normal operating function of the damping valve arrangement. The damping medium flows along the first feed flow channel 61 in the valve body 35 and the opened check valve 79, then further along the damping medium flow path 55 to the additional valve closing surface $A_{CloseD2}$. A first closing force component exerts the pressure on this valve closing surface $A_{CloseD2}$. Further, damping medium flows through the flow connection 65 in the connection sleeve 66 and through the opened emergency operation valve 67 into the rear space 59. The damping valve 81 for the additional pressure-impinged surface $A_{CloseD2}$ is closed owing to the incident flow through the feed flow channel 61. As was already described, the back side 41 of the main stage valve body 35 forms the pressure-impinged surface $A_{CloseD}$ that is acted upon by the static pressure in the working space 11. The closing force acting on the main stage valve body 35 is composed of the resulting closing force, which acts directly on the back side 41 of the main stage valve body 35 via the auxiliary valve body, and the pressure forces on surfaces $A_{CloseD}$ and $A_{CloseD2}$. A surface $A_{ÖD}$ at the valve ring 47 is slightly larger than the sum of surfaces $A_{CloseD}$ and $A_{CloseD2}$ so as to exclude blocking of the lift movement of the main stage valve body 35 due to the pressure ratios. The pressure in the control space 57 of the main stage valve body plays no part in this incident flow direction of the damping valve arrangement because the auxiliary valve is bypassed by the flow connection 65 to the rear space 59.

Particular with minimal energizing of the actuator 15 and with an incident flow of the main stage valve body 35, the auxiliary valve seat body 32 can quickly move slightly to the shaft portion 82 against the small closing force of the spring element 87. The main stage valve body 35 can follow this movement and take up a passage. The inertia of the armature 19 in this case does not affect this initial movement of the main stage valve body 35 because the spring element 87 functions in a series connection with the armature 19. When the relative movement of the auxiliary valve seat body 32 toward the shaft portion 83 is concluded as intended by operation, the spring element 87 contacts the spring holder 85.

A second operating state concerns the emergency operating state of the damping valve arrangement 1 and an incident flow of the damping valve arrangement 1 proceeding from passage 117. The emergency operation valve 67 is closed due to the absence of energy supply via the actuator 15. The auxiliary valve seat body 32, as part of the auxiliary valve body 21, is guided so as to be slightly displaceable axially inside the auxiliary valve body 21. In the deenergized state of the magnetic coil 17, the valve springs 25; 27 hold the shaft portion 83 of the auxiliary valve body 21, considered statically, i.e., without incident hydraulic flow, at a maximum distance from the auxiliary valve seat surface 29. Therefore, the auxiliary valve seat body 32 could occupy a maximum lift position when loaded even by the slightest pressure proceeding from the control space 57. When the emergency operation valve is closed, however, the preloading of the auxiliary valve closing spring 30 is maximized. Regardless of the dimensioning of the valve springs 25; 27, the auxiliary valve closing spring 30 moves the auxiliary valve seat body 32 into a closed position on the auxiliary valve surface 29. The rear space 59 is accordingly closed off from any incident flow via the control space 57 and flow connection 65. As in the normal operating state, the damping medium reaches the additional pressure-impinged surface $A_{CloseD2}$ via the feed flow channel 61 in the main stage valve body 35 and the open check valve 79. In order that the main stage valve body 35 together with the valve ring 47 can lift from the housing-side valve seat surface 49, the damping valve 81 in the main stage valve body 35 opens so that damping medium which is displaced from the rear space 59 can flow off via the flow-off channel 63 in main stage valve body 35 in direction of the additional pressure-impinged surface $A_{CloseD2}$. Accordingly, the main stage valve cannot open quickly in an uncontrolled manner, but only after overcoming the damping force of the damping valve 81. When the motion of the piston rod is reversed, the opening pressure on the main stage valve body 35 decreases and a closing spring 129 moves the main stage valve body quickly back into the closed position with open check valve 79.

The third operating state concerns an incident flow of the damping valve arrangement 1 proceeding from the working chamber 9 on the piston rod side and open emergency operation valve 67. The damping medium flows through the connection orifice 75 in the connection sleeve 66 to the pressure-impinged surface $A_{ÖZ}$ at the radial shoulder 43 and then to the pressure-impinged surface which now functionally forms a closing surface $A_{CloseZ}$. The pressure-impinged surface at the radial shoulder of the main stage valve body is operative for both incident flow directions of the damping valve arrangement. Depending on the energy supply of the actuator 15, there ensues an auxiliary valve position by which, in turn, a control pressure in the control space 57 and accordingly also at the pressure-impinged surface $A_{CloseZ}$ can be controlled. The pressure acting on an annular surface $A_{ÖZ}$ opposes the pressure acting in the closing direction on surface $A_{CloseZ}$. Because of the outlet throttle 86 which now functions as an inlet throttle, there is a pressure gradient between the pressures at surfaces $A_{ÖZ}$ and $A_{CloseZ}$ when the auxiliary valve 23 is open, so that the hydraulic opening force at the main stage valve body 35 is always somewhat greater than the hydraulic closing force. The pressure in the connection orifice 75 also acts on the valve ring 47 which is accordingly pressed on the housing-side valve seat surface 49. Therefore, the main stage valve body 35 lifts from the valve seat surface 45 of the valve ring 47. With its check valve function, the damping valve 81 prevents a hydraulic short circuit of the auxiliary valve 23. The function of the spring holder 85 is identical to that described in the first operating state.

The damping medium flowing out of the control space 57 through the auxiliary valve 23 arrives in the rear space 59 and through the open emergency operation valve 67 and flow connection 65 in the connection sleeve 66 into the working chamber 11 remote of the piston rod. Consequently, the rear space 59 has an inlet and an outlet with the working chamber 11 of the vibration damper.

In the fourth operating state, the feed flow again takes place via the connection orifice 75 in the connection sleeve 66, but the emergency operation valve 67 is closed. The flow path to the auxiliary valve 23 corresponds to the description of the third operating state. In contrast, the auxiliary valve 23 is closed due to the auxiliary valve seat spring 30. The closing spring 129 ensures that the main stage valve body 35, together with the valve ring 47, is seated on the housing-side valve seat surface 49. This prevents a hydraulic short circuiting between the working chambers via the connection orifice 75. The damping medium arrives in the rear space 59 whose outlet is blocked by the closed emergency operation valve 67. The damping valve 81 also remains closed. A flow path 131 to a pressure limiting valve 133 by which a defined pressure level in the rear space 59 can be determined is formed in the valve ring 69 of the emergency operation valve 67. The pressure level in the rear space 59 and, therefore, on the back side 41 of the main stage valve body 35 and on the pressure-impinged surface at the radial shoulder $A_{CloseZ}$ determines the closing force in emergency operation of the damping valve arrangement 1. It is clear from a comparison of the second operating state and fourth operating state that the emergency operation valve 67 is effective in only one incident flow direction of the damping valve arrangement 1 via the connection orifice 75. Tests have shown that this design of the damping valve arrangement 1 is suitable for reliable operating behavior of a vibration damper.

Figure 2:
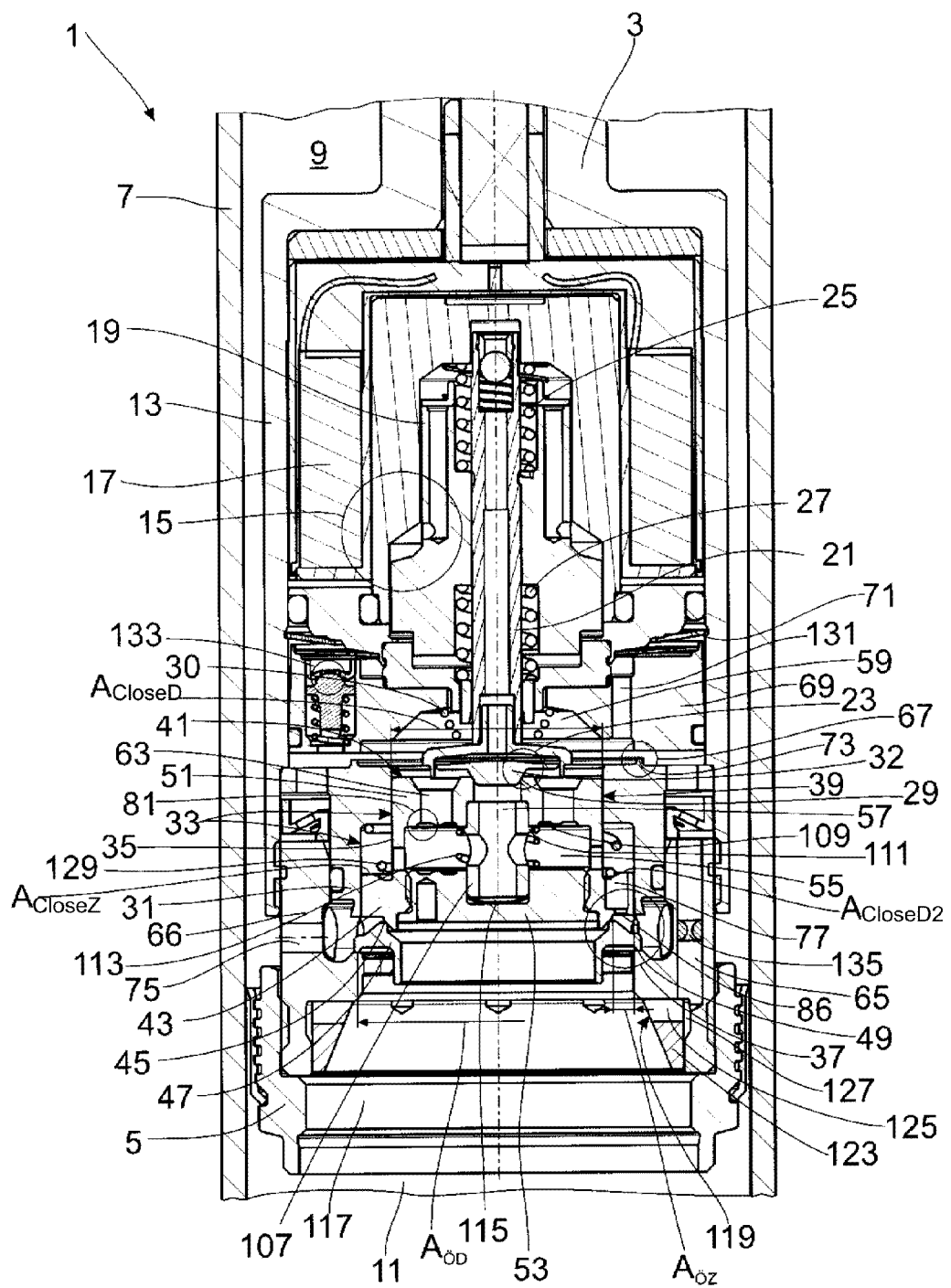
FIG. 2 shows adjustable damping valve arrangement with two pressure-impinged surfaces arranged in series.

FIG. 2 shows a modification, based on FIG. 1, in which the two pressure-impinged closing surfaces $A_{CloseD}$; $A_{CloseD2}$ are arranged in series with respect to the flow path proceeding from the working space 11 remote of the piston rod via the flow connection 65. There is no direct incident flow from the working space remote of the piston rod via the feed flow opening 61 as in FIG. 1. Accordingly, it is always only the static pressure that acts on both pressure-impinged closing surfaces during an incident flow from the working space remote of the piston rod.

Alternatively or in addition to the annular element 123, the flow connection to the two pressure-impinged closing surfaces $A_{CloseD}$; $A_{CloseD2}$ can have a throttle 135 which once again reduces the pressure level proceeding from the static pressure in the working space remote of the piston rod. The functional difference between the throttle 135 and the flow-in opening 119 consists in that the flow-in opening is also effective when there is no flow connection between the working space and the pressure-impinged surface, but rather a stationary connection as is the case, e.g., when the emergency operation valve 67 is closed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An adjustable damping valve arrangement for a vibration damper comprising:
    an actuator (15);
    an auxiliary valve (23) comprising an auxiliary valve body (21);
    a main stage valve (37) having a flow direction of a damping medium into said main stage valve and at least one pressure-impinged closing surface; said actuator (15) exerting an actuating force on said auxiliary valve body (21) of said auxiliary valve (23) and said auxiliary valve influencing a closing force on said main stage valve (37);
    a flow connection (65) for permitting a pressure depending on the pressure level in a working space (9, 10) of said vibration damper to act on at least one of said pressure-impinged closing surfaces of said main stage valve (37); said flow connection (65) constructed so as to be functionally parallel to an incident flow of said main stage valve (37) and comprising a flow-in opening (119) oriented at an angle of at least 60° to the flow direction into said main stage valve (37) so that only a static pressure acts on said at least one closing surface of said main stage valve (37); and
    a deflecting profile (121) formed as an annular element (123) arranged upstream of said flow-in opening (119) in flow direction.

2. The damping valve arrangement according to claim 1, wherein said the main stage valve (37) comprises a plurality of pressure-impinged closing surfaces for one incident flow direction which are connected to said flow-in opening (119).

3. The damping valve arrangement according to claim 2, wherein at least two pressure-impinged closing surfaces are arranged in series with respect to the flow path.

4. The damping valve arrangement according to claim 2, wherein a flow-in opening (119) is formed for only one working space (11).

5. The damping valve arrangement according to claim 1, wherein said the annular element (123) comprises channel portions (125) of said flow connection (65).

6. The damping valve arrangement according to claim 1, wherein said the flow-in opening (119) is arranged upstream of said main stage valve (37) with respect to the flow path.

7. The damping valve arrangement according to claim 1, additionally comprising a collecting channel (125) running in circumferential direction arranged downstream of said flow-in opening (119) and connected to individual channels of said flow connection (65).

8. The damping valve arrangement according to claim 1, additionally comprising a throttle (135) arranged in the flow connection.

\* \* \* \* \*